United States Patent
Mankowski et al.

(10) Patent No.: US 10,146,988 B2
(45) Date of Patent: Dec. 4, 2018

(54) OBTAINING A BIOMETRIC IMAGE AND HANDLING DAMAGED BIOMETRICS

(71) Applicant: BlackBerry Limited, Waterloo (CA)

(72) Inventors: Peter Mankowski, Waterloo (CA);
Adam Sosnowski, Kitchener (CA);
Krzysztof Zawada, East Hazel Crest, IL (US)

(73) Assignee: BlackBerry Limited, Waterloo (CA)

(*) Notice: Subject to any disclaimer, the term of this patent is extended or adjusted under 35 U.S.C. 154(b) by 286 days.

(21) Appl. No.: 13/925,111

(22) Filed: Jun. 24, 2013

(65) Prior Publication Data
US 2014/0375786 A1 Dec. 25, 2014

(51) Int. Cl.
*G06K 9/00* (2006.01)
*G06K 9/03* (2006.01)

(52) U.S. Cl.
CPC ..... *G06K 9/00033* (2013.01); *G06K 9/00926* (2013.01); *G06K 9/036* (2013.01)

(58) Field of Classification Search
None
See application file for complete search history.

(56) References Cited

U.S. PATENT DOCUMENTS

| | | | |
|---|---|---|---|
| 5,974,162 A | 10/1999 | Metz et al. | |
| 7,184,580 B2 | 2/2007 | Hamid | |
| 7,526,110 B2 * | 4/2009 | Niinuma et al. | 382/125 |
| 8,076,624 B1 * | 12/2011 | Barchers | F41H 13/005 250/201.9 |
| 8,605,962 B2 * | 12/2013 | Monden | 382/125 |
| 2002/0154793 A1 * | 10/2002 | Hillhouse et al. | 382/115 |
| 2004/0008875 A1 * | 1/2004 | Linares | G06K 9/00013 382/124 |
| 2005/0226474 A1 | 10/2005 | Merbach et al. | |
| 2010/0303310 A1 * | 12/2010 | Chiu | 382/124 |
| 2012/0300989 A1 | 11/2012 | Nakashima | |
| 2014/0093146 A1 * | 4/2014 | Inanc | G06K 9/00073 382/125 |

FOREIGN PATENT DOCUMENTS

| | | | |
|---|---|---|---|
| CN | 1320847 A | * | 11/2001 |
| EP | 1417633 B1 | | 5/2007 |
| WO | 2012090287 A1 | | 7/2012 |
| WO | 2012140830 A1 | | 10/2012 |

OTHER PUBLICATIONS

Depth resolved wavefront aberrations using a coherence gated shack hartmann wavefront sensor, by Tuohy et al Feb. 3, 2010, Optics Express3458-3476.*

(Continued)

*Primary Examiner* — Vikkram Bali
(74) *Attorney, Agent, or Firm* — Fish & Richardson P.C.

(57) ABSTRACT

Inspired by Shack Hartmann Wavefront Patterns, a device may obtain three dimensional images for use in authentication. Since such images can have high resolution, damage in, for instance, skin on a finger may be recorded and used as part of a temporary template image. In future authentication attempts, an aged version of the temporary template image may be used. Additionally, reference points on the damage may be employed when authenticating.

14 Claims, 11 Drawing Sheets

(56) References Cited

OTHER PUBLICATIONS

Biometric Fingerprint Sensors; http://www.ee.nthu.edu.tw/whhsu/96up/01%20Fingerprint%20sensing%20techniques.ppt "Fingerprint Sensing Techniques", 2004 Genesoft Labs, retrieved on Sep. 4, 2013.

IDair's new fingerprint readerr captures prints from 6 meters away; http://blog.al.com/breaking/2012/06/idairs_new_fingerprint_reader.html; published Jun. 21, 2012 and retrieved on Sep. 9, 2013.

Hsu; Fingerprint sensing techniques, Biometrics Tech. and Application; http://www.gslpr.com/BiometricTechno/FingerprintSensors.asp genesoft labs—biometric fingerprint sensors published on Sep. 20, 2007.

Optical Application FAQs: pulstec Industrial Co. Ltd.; http://www.pulstec.co.jp/en/pr/opt/pr_o04.html, retrieved on Sep. 24, 2013.

"If a wound is not too deep, the finger lines will fully regenerate to their original state. Deep cuts leave line forming scars, and should be recognized as such by good identification algorithms, thereby barely impairing the identification performance. Most systems offer the possibility to record a "substitute finger" in enrollment, so that a fingerprint authentication can still take place during the healing process."http://www.bromba.com/faq/fpfaqe.htm#Wunden; Dec. 19, 2011 and retrieved on Sep. 4, 2013.

http://www.thirdfactor.com/2012/11/28/lumidigm-goes-below-the-skin-for-stronger-fingerprint-templates; "Conventional fingerprint readers rely on surface characteristics, but Lumidigm uses multi-spectral approach to capture the fingerprint, explains Bill Spence, vice president of transaction systems at Lumidigm," retrieved on Sep. 4, 2013.

"Novel approach to automated fingerprint recognition" by A. Wahab et al., IEE Proc. Conf. Vision, Image and Signal Processing, vol. 145, No. 3, 1998, pp. 160-166.

Extended European Search Report Jun. 10, 2014; in corresponding European patent application No. 13173423.8.

Vandersteegen, Peter et al.; "title Employing a 2D surface granting to improve light out coupling of a substrate emitting organic LED<title>", proceedings of spie; vol. 6486, Feb. 8, 2007, pp. 64860h-64860h-8, XP55113363, ISSN: 0277-786X.

Partial European Search Report dated Apr. 29, 2014; in corresponding European patent application No. 13173423.8.

English abstract for WO 2012/090287; published on Jul. 5, 2012 and retrieved on Jun. 19, 2014.

English abstract for WO 2012/140830; published on Oct. 18, 2012 and retrieved on Jun. 19, 2014.

\* cited by examiner

OBTAINING A BIOMETRIC IMAGE AND HANDLING DAMAGED BIOMETRICS

FIELD

The present application relates generally to authentication for a computing device and, more specifically, to obtaining a biometric image and handling damaged biometrics.

BACKGROUND

As mobile telephones have received increasing amounts of computing power in successive generations, the mobile telephones have been termed "smart phones." Along with increasing amounts of computing power, such smart phones have seen increases in storage capacity, processor speed and networking speed. Consequently, smart phones have been seen to have increased utility. Beyond telephone functions, smart phones may now send and receive digital messages, be they formatted to use e-mail standards, Short Messaging Service (SMS) standards, Instant Messaging standards and proprietary messaging systems. Smart phones may also store, read, edit and create documents, spreadsheets and presentations. Accordingly, there have been increasing demands for smart phones with enhanced authentication functions.

BRIEF DESCRIPTION OF THE DRAWINGS

Reference will now be made, by way of example, to the accompanying drawings which show example implementations; and in which.

DETAILED DESCRIPTION

Figure 1:
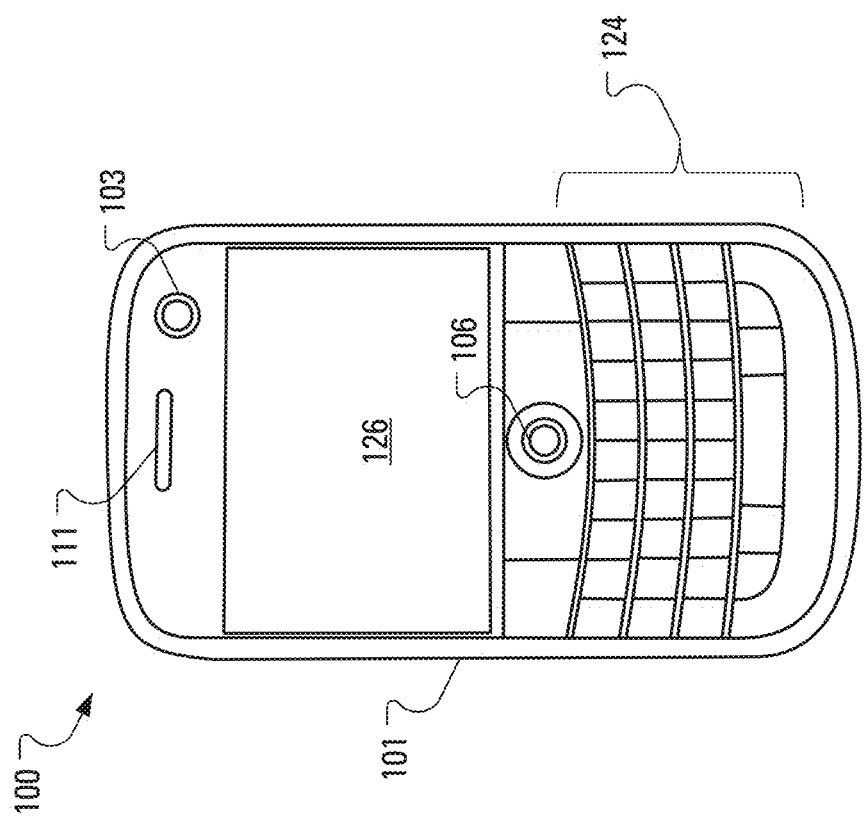
FIG. 1 illustrates an anterior side of a mobile communication device.

Inspired by Shack Hartmann Wavefront Patterns, a device may obtain three dimensional images for use in authentication. Since such images can have high resolution, damage in, for instance, skin on a finger may be recorded and used as part of a temporary template image. In future authentication attempts, an aged version of the temporary template image may be used. Additionally, reference points on the damage may be employed when authenticating.

According to an aspect of the present disclosure, there is provided an input system comprising a light source, a microlens array arranged to receive light from the light source and generate a plurality of parallel, circular cross-section beamlets, a lens, a photography subsystem arranged to receive input from the lens and generate, based on the input, an image that includes a plurality of shapes formed as a result of the plurality of beamlets reflecting from a surface and an image signal processor arranged to receive, from the photography subsystem, the image and, based on the image, generate a digital representation of the surface.

According to another aspect of the present disclosure, there is provided a method of generating a temporary fingerprint template image. The method includes obtaining a candidate fingerprint image, analyzing a degree of correspondence between the candidate fingerprint image and a stored template fingerprint image, determining that the degree of correspondence between the candidate fingerprint image and the stored template fingerprint image surpasses a threshold, responsive to the determining, determining that a finger, from which the candidate fingerprint image has been obtained, is damaged and responsive to determining that the finger is damaged, generating a temporary template fingerprint image. In other aspects of the present application, a processor is provided for carrying out this method and a computer readable medium is provided for adapting a processor to carry out this method.

According to a further aspect of the present disclosure, there is provided a method of authenticating a user in a system wherein a temporary template fingerprint image has been stored. The method includes obtaining a candidate fingerprint image, generating an aged version of the temporary template fingerprint image, the generating based on modeling a change expected to have occurred between a time of generation of the temporary template fingerprint image and a current time, analyzing a degree of correspondence between the candidate fingerprint image and the aged version of the temporary template fingerprint image, determining that the degree of correspondence between the candidate fingerprint image and the aged version of the temporary template fingerprint image surpasses a threshold and responsive to the determining, granting access to a system.

Other aspects and features of the present disclosure will become apparent to those of ordinary skill in the art upon review of the following description of specific implementations of the disclosure in conjunction with the accompanying figures.

FIG. 1 illustrates an anterior side of a mobile communication device 100. Many features of the anterior side of the mobile communication device 100 are mounted within a housing 101 and include a display 126, a keyboard 124 having a plurality of keys, a speaker 111, a navigation device 106 (e.g., a touchpad, a trackball, a touchscreen, an optical navigation module) and an anterior (user-facing) lens 103.

The mobile communication device 100 includes an input device (e.g., the keyboard 124) and an output device (e.g., the display 126), which may comprise a full graphic, or full color, Liquid Crystal Display (LCD). In some implementations, the display 126 may comprise a touchscreen display. In such touchscreen implementations, the keyboard 124 may comprise a virtual keyboard provided on the display 126. Other types of output devices may alternatively be utilized.

The housing 101 may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

Figure 2:
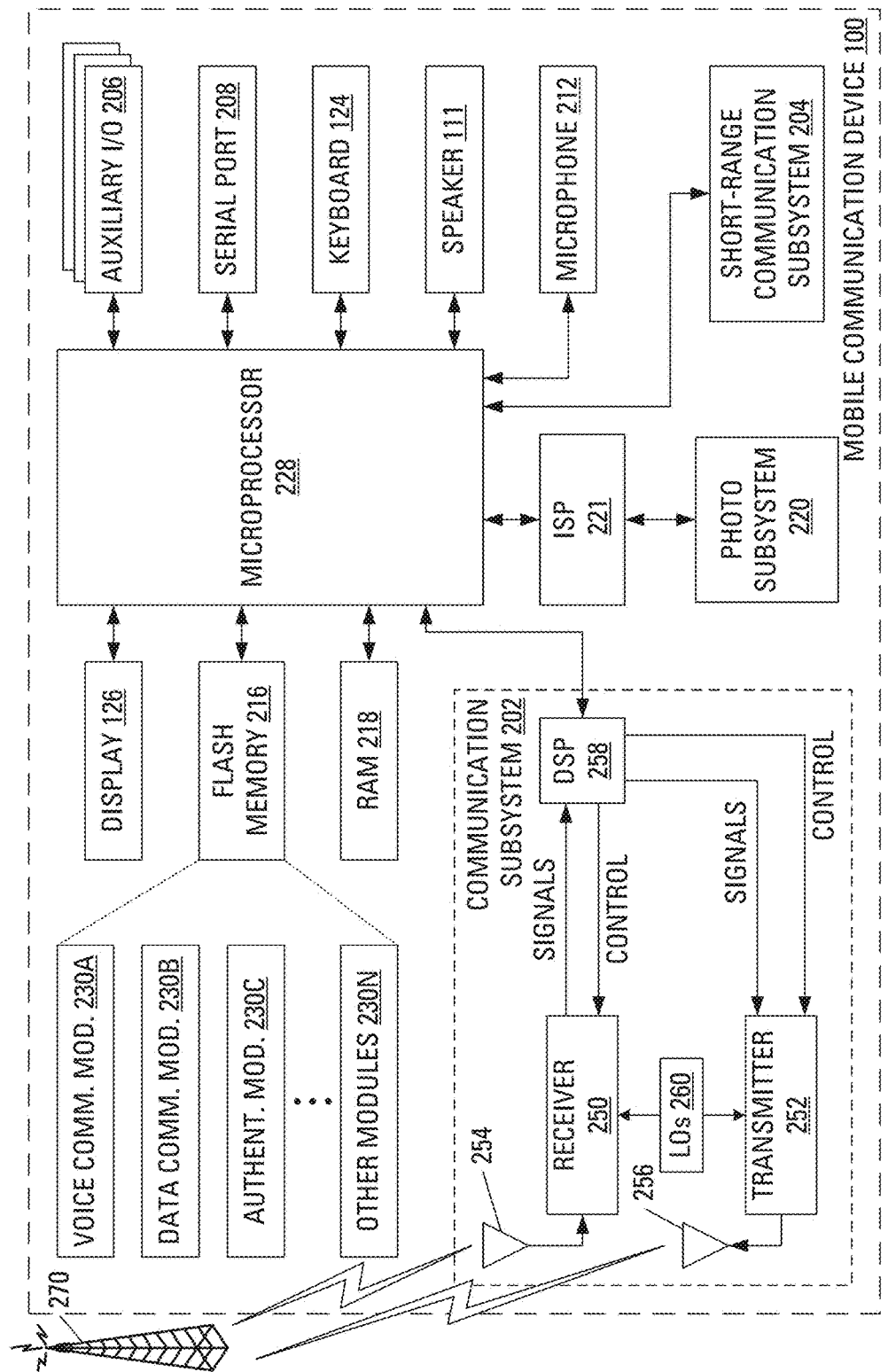
FIG. 2 illustrates an example arrangement of internal components of the mobile communication device of FIG. 1.

FIG. 2 illustrates an example arrangement of internal components of the mobile communication device 100. A processing device (a microprocessor 228) is shown schematically in FIG. 2 as coupled between the keyboard 124 and the display 126. The microprocessor 228 controls the operation of the display 126, as well as the overall operation of the mobile communication device 100, in part, responsive to actuation of the keys on the keyboard 124 by a user.

In addition to the microprocessor 228, other parts of the mobile communication device 100 are shown schematically in FIG. 2. These may include a communications subsystem 202, a short-range communications subsystem 204, the keyboard 124 and the display 126. The mobile communication device 100 may further include other input/output devices, such as a set of auxiliary I/O devices 206, a serial port 208, the speaker 111 and a microphone 212. The mobile communication device 100 may further include memory devices including a flash memory 216 and a Random Access Memory (RAM) 218 as well as various other device subsystems. The mobile communication device 100 may comprise a two-way, radio frequency (RF) communication device having voice and data communication capabilities. In addition, the mobile communication device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. An authentication module 230C may also be installed on the mobile communication device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 100 is intended to operate. For example, the communication subsystem 202 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 126, or alternatively to some auxiliary I/O devices 206. A device user may also compose data items, such as e-mail messages, using the keyboard 124 and/or some other auxiliary I/O device 206, such as the navigation device 106, a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 111, and signals for transmission are generated by a microphone 212. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

An anterior photography subsystem 220 connects to the microprocessor 228 via an Image Signal Processor (ISP) 221. Indeed, the anterior photography subsystem 220 includes a communication interface (not shown) for managing communication with the ISP 221.

Figure 3:
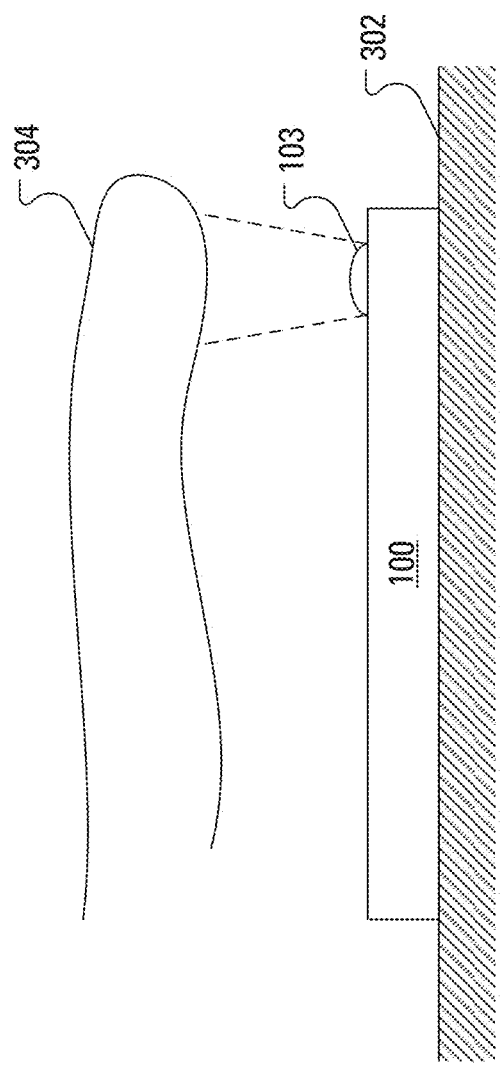
FIG. 3 illustrates schematically illustrates the mobile communication device of FIG. 1 resting on a surface.

FIG. 3 schematically illustrates the mobile communication device 100 resting on a surface 302. A finger 304 is illustrated in a position wherein the photography subsystem 220 may receive input via the lens 103. The photography subsystem 220 may generate, based on the input, an image of a fingerprint on the finger 304 being presented to the lens 103. The image is known to be "flat." That is, the image obtained by the photography subsystem 220 typically does not include depth information.

Figure 4:
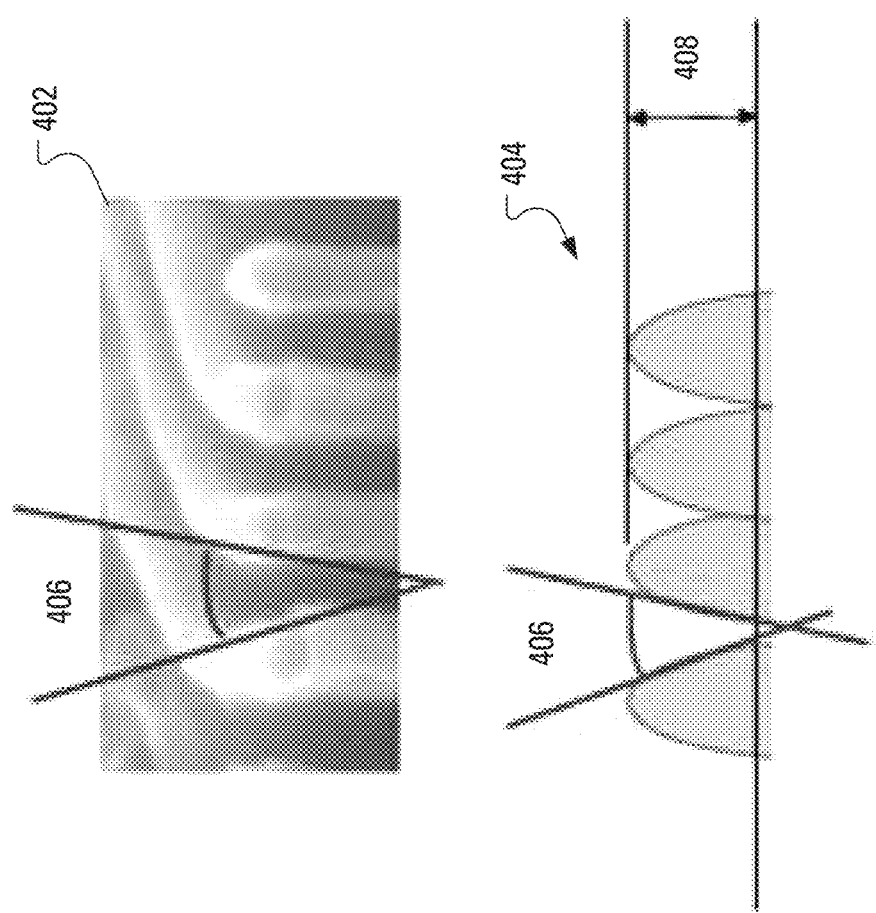
FIG. 4 illustrates a close-up image in which is illustrated that a real fingerprint has ridges and valleys.

A real fingerprint has ridges and valleys. A close-up image 402 of a real fingerprint is illustrated in FIG. 4. Furthermore, the ridges and valleys have recession depth and angular characteristics. In a representation 404 of the ridges and valleys, an angular characteristic 406 is referenced and a recession depth 408 is referenced.

Accordingly, strides have been made and are being made in the area of performing authentication using three dimensional fingerprints. However, there is no standard for an effective method of measuring fingerprint coordinates in three (x, y and z) dimensions using the high resolution camera systems that have recently been included in mobile communication devices.

In overview, it is proposed herein to employ principles used in a "Shack Hartmann Wavefront Sensor" when obtaining a fingerprint image. With appropriate Digital Signal Processing, three dimensional fingerprint information may be used for authentication.

A Shack Hartmann Wavefront Sensor divides an incident wavefront, from a light source (not shown) into a number of beamlets by two-dimensional sub-apertures of a microlens array. Each microlens provides a separate focus on the detector of a Charge Coupled Device (CCD) camera. The position of each focus spot is displaced by local wavefront aberrations. Shack Hartmann Wavefront Sensors measure both intensity distribution and phase distortion.

Microlens arrays for Shack Hartmann Wavefront Sensors usually have small lens apertures to provide high spatial resolution for wavefront sensing. Microlenses with small lens apertures and long focal lengths have low Fresnel Numbers. Conveniently, microlenses with low Fresnel Numbers (FN) are more dominated by diffraction effects at the lens aperture than by refraction of the incident light at the lens profile.

Figure 5:
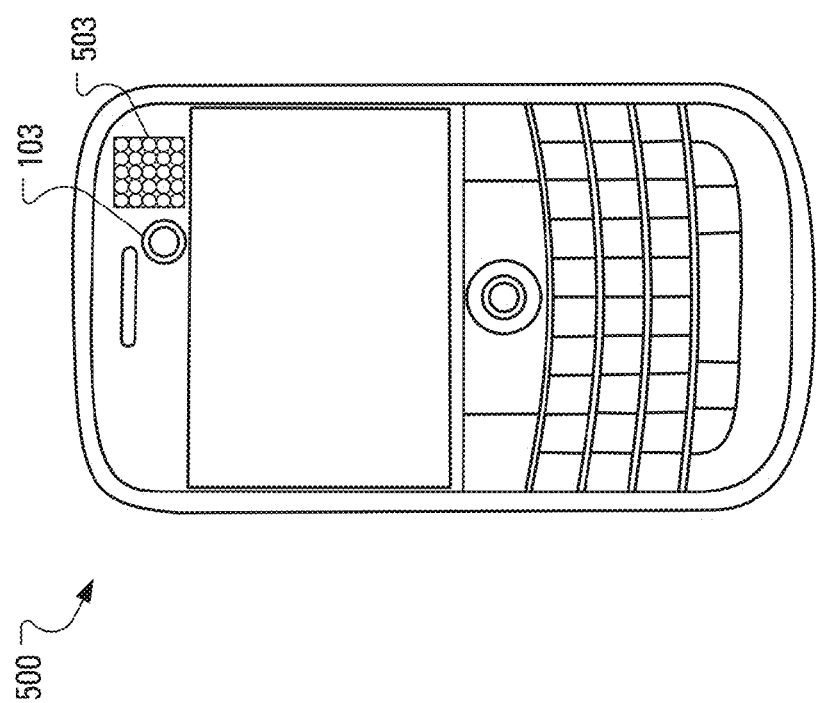
FIG. 5 illustrates a mobile communication device, similar to the mobile communication device of FIG. 1, including a microlens array.

FIG. 5 illustrates a mobile communication device 500 similar to the mobile communication device 100 of FIG. 1. The position of the lens 103 of the mobile communication device 100 of FIG. 1 has been shifted to make room for a microlens array 503 in the mobile communication device 500 of FIG. 5.

In operation, responsive to a finger 304 being brought into proximity to the lens 103 (see FIG. 3), a light source (not shown) behind the microlens array 503 is controlled by the microprocessor 228 to produce light that passes through the microlens array 503. The light exiting the microlens array 503 is a Shack Hartmann Wavefront Pattern, which may be characterized as a set of parallel, circular cross-section beamlets.

Figure 6:
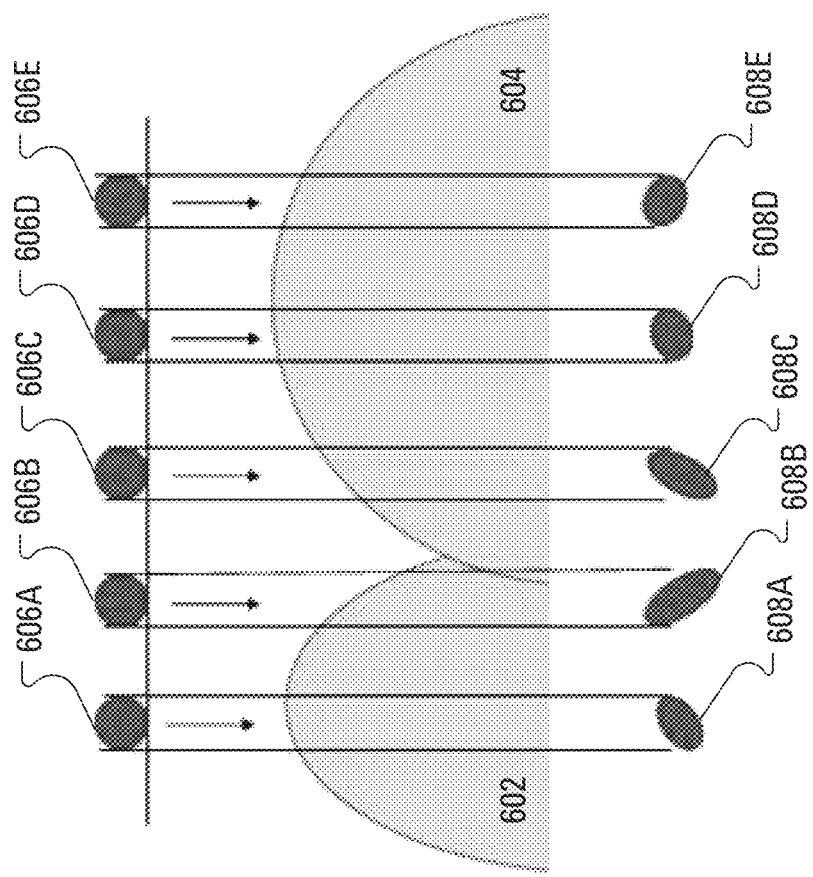
FIG. 6 illustrates a first ridge and a second ridge of a fingerprint.

FIG. 6 illustrates a first ridge 602 and a second ridge 604 of a fingerprint. A first representation 606A of a circular cross-section beamlet is illustrated along with a representation 608A of a shape the beamlet makes upon reaching the first ridge 602. A second representation 606B of a circular cross-section beamlet is illustrated along with a representation 608B of a shape the beamlet makes upon reaching the first ridge 602. A third representation 606C of a circular cross-section beamlet is illustrated along with a representation 608C of a shape the beamlet makes upon reaching the second ridge 604. A fourth representation 606D of a circular cross-section beamlet is illustrated along with a representation 608D of a shape the beamlet makes upon reaching the second ridge 604. A fifth representation 606E of a circular cross-section beamlet is illustrated along with a representation 608E of a shape the beamlet makes upon reaching the second ridge 604.

As can be seen from FIG. 6, a Shack Hartmann Wavefront Pattern (collectively referenced by numeral 606) is distorted upon arriving on skin such that angular details of the skin produce shapes (collectively referenced by numeral 608) that are not circular.

Figure 7:
FIG. 7 illustrates a typical two-dimensional fingerprint representative of a fingerprint being sensed by the mobile communication device of FIG. 5.

FIG. 7 illustrates a typical two-dimensional fingerprint 702 representative of a fingerprint being sensed by the mobile communication device 500 of FIG. 5. A small section 704 of the fingerprint 702 is referenced.

The photography subsystem 220, under control of the microprocessor 228 captures, via the lens 103, a high resolution image of the finger 304. Included in the captured image are the shapes 608 resulting from the beamlets produced by the microlens array 503.

Figure 8:
FIG. 8 illustrates a small section of the fingerprint of FIG. 7.

FIG. 8 illustrates the small section 704 of the fingerprint 702 of FIG. 7, with the shapes 608 visible.

In operation, the microlens array 503 produces a plurality of parallel, circular cross-section beamlets from incident light received from a light source (not shown) within the mobile communication device 100. Returning to FIG. 3, the finger 304 is illustrated in a position wherein the plurality of parallel, circular cross-section beamlets illuminate the surface of the finger 304.

The photography subsystem 220 may receive, via the lens 103, input comprising a plurality of shapes (see the shapes 608 of FIG. 6). The photography subsystem 220 may generate, based on the input, an image of a fingerprint on the finger 304 being presented to the lens 103. In contrast to the image captured in the arrangement of FIG. 1, which image is known to be "flat," the image captured in the arrangement of FIG. 5 may be considered to include enough information to obtain a three-dimensional digital representation of the fingerprint. That is, the image obtained by the photography subsystem 220 includes depth information. The photography subsystem 220 may pass the captured image to the ISP 221. The ISP 221 may process the image to register a measure of a deviation (from the original circular shape) for each shape 608, translating the deviation measures into a digital representation of the fingerprint. The digital representation of the fingerprint may be considered to be three-dimensional, in that the digital representation of the fingerprint includes recession depth information and angular characteristic information.

The three-dimensional digital representation of the fingerprint may be used to generate a template for future authentication or may be considered to be a candidate fingerprint for comparison to a previously generated template.

Conveniently, the three-dimensional digital representation of the fingerprint may be considered to be a highly detailed representation and it is proposed herein that the additional detail, when compared to two-dimensional fingerprint authentication schemes, may be used to further increase security in a system of authentication.

For example, the static nature of a fingerprint template, formed at a registration stage and seldom updated, may be seen as a flaw in existing fingerprint authentication schemes. Given that people use their hands so much in day-to-day life, often fingerprints are damaged. Example damage includes a scratch, a burn or a reduction in the distinctiveness of the ridges due to friction (consider the fictional safe cracker, who uses sandpaper to try to make the fingers more sensitive).

In many cases, the damage is temporary and, accordingly, there is little incentive to go through the effort to produce a new template.

In overview, it is proposed herein to recognize damage to a fingerprint and dynamically alter an associated template.

Figure 9:
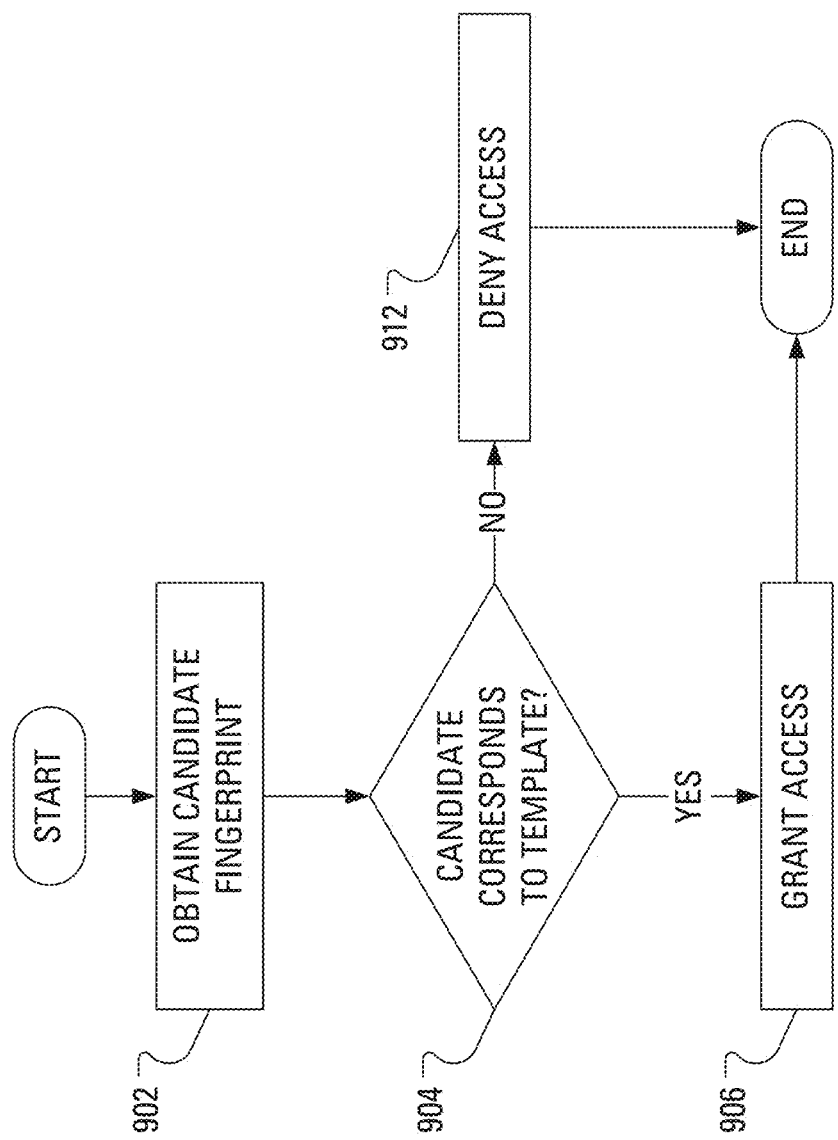
FIG. 9 illustrates example steps in a method of authenticating a user.

Consider an original template fingerprint image, generated and stored at a time of registration with a fingerprint authentication system. In a future authentication attempt, a user presents a finger to a fingerprint input device. A processor, as part of the fingerprint authentication system and via a fingerprint input device, obtains (step 902, see FIG. 9) a candidate fingerprint image from the finger. The processor analyzes a correspondence between the candidate fingerprint image and the stored template fingerprint image. Responsive to determining (step 904) a degree of correspondence surpassing a threshold, the processor may grant (step 906) the user access to that which is protected by the fingerprint authentication system. Responsive to determining (step 904) a degree of correspondence that fails to surpass the threshold, the processor may deny (step 912) the user access to that which is protected by the fingerprint authentication system.

Now consider that the finger, based on which the original template fingerprint image was generated, is somehow damaged. The processor obtains (step 1002, FIG. 10), via the fingerprint input device, a candidate fingerprint image from the damaged finger. The processor analyzes a correspondence between the candidate fingerprint image, from the damaged finger, and the stored template fingerprint image.

It is proposed herein that the processor may determine (step 1004) a degree of correspondence that surpasses a threshold and, consequently, the processor may grant (step 1006), to the user with the damaged finger, access to that which is protected by the fingerprint authentication system. It is also proposed herein that the processor may determine (step 1007) that the finger is damaged. Responsive to determining (step 1007) that the finger is damaged, the processor may generate (step 1008) and store (step 1010) a temporary template fingerprint image in conjunction with a timestamp.

Figure 10:
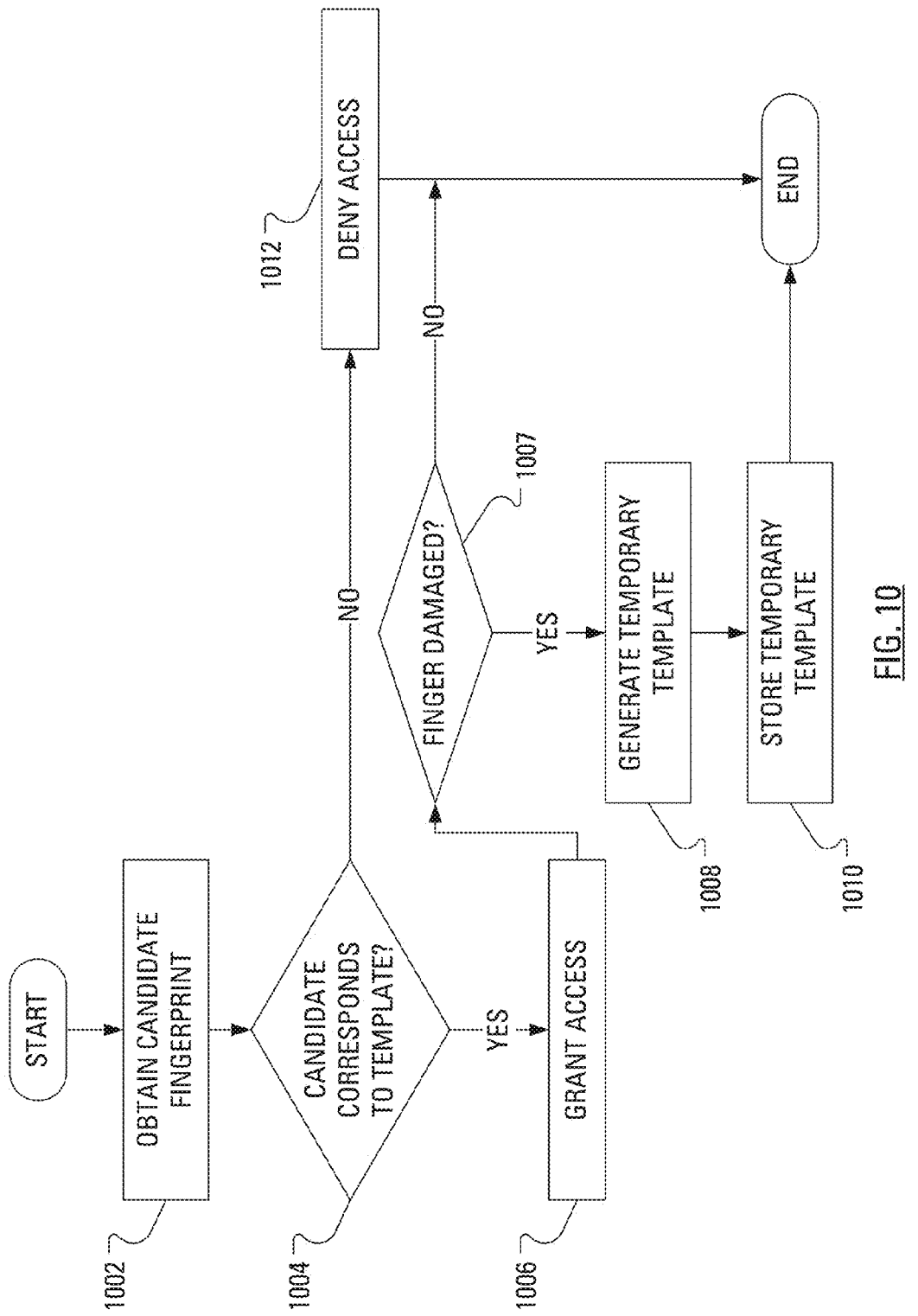
FIG. 10 illustrates example steps in a method of authenticating a user when the user has a damaged finger.

Responsive to determining (step 1007) that the finger is not damaged, the processor may simply consider the method of FIG. 10 to be complete.

Responsive to determining (step 1004) a degree of correspondence that fails to surpass the threshold, the user is denied access (step 1012) to that which is protected by the fingerprint authentication system.

Figure 11:
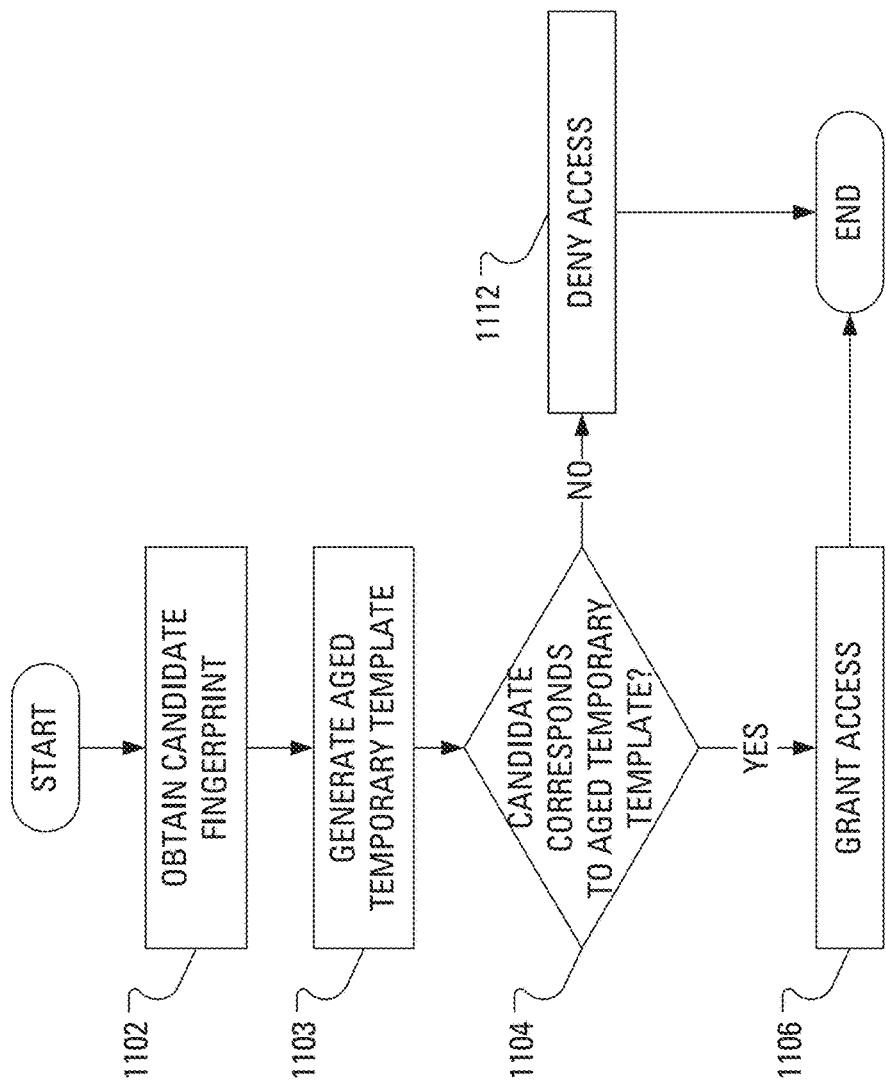
FIG. 11 illustrates example steps in a method of authenticating a user when the user has a damaged finger and a temporary template image has already been generated.

At a later time, the processor may, via the fingerprint input device, obtain (step 1102, see FIG. 11) a further candidate fingerprint image from the damaged finger. The processor, as part of the fingerprint authentication system, generates (step 1103) an aged version of the stored temporary template fingerprint image based on a difference between the current time and the timestamp stored with the temporary template fingerprint image. The processor, as part of the fingerprint authentication system, analyzes a correspondence between the further candidate fingerprint image, from the damaged finger, and the aged version of the stored temporary template fingerprint image. Responsive to a degree of correspondence being determined (step 1104) to surpass the threshold, the user is granted access (step 1106) to that which is protected by the fingerprint authentication system. Responsive to determining (step 1104) a degree of correspondence that fails to surpass the threshold, the user is denied access (step 1112) to that which is protected by the fingerprint authentication system.

The aged temporary template fingerprint image is distinct from the temporary template fingerprint image originally stored. It is recognized that skin heals over time. Furthermore, it is recognized that the healing of skin over time may be modeled. Accordingly, the aged temporary template fingerprint image may be generated (step 1103) according to a model of the manner in which skin is known to heal over time. Eventually, the aged temporary template fingerprint image will match the original template fingerprint image. At that point, the temporary template fingerprint image may be discarded.

It is contemplated that, in an attempt to fraudulently gain access to that which is protected by the fingerprint authentication system, an unauthorized person may obtain a cast of a fingerprint of an authorized person. The unauthorized person may create, from the cast, a physical copy of the fingerprint of the authorized person. The unauthorized person then attempt to use the physical copy of the fingerprint of the authorized person to fraudulently gain access to that which is protected by the fingerprint authentication system.

In general, there is expected to be a passage of time between the time at which the unauthorized person has obtained the cast of the fingerprint of the authorized person and the time at which the unauthorized person attempts to fraudulently gain access to that which is protected by the fingerprint authentication system. Accordingly, there are at least two scenarios to consider.

In a first scenario, the unauthorized person has obtained a cast of an undamaged fingerprint of the authorized person. When the fingerprint authentication system is operating in a mode wherein the temporary template fingerprint image is being used for authentication, the fingerprint authentication system may recognize that the damage to the fingerprint has suddenly healed, in a manner not predicted by the model of the manner in which skin is known to heal over time. Responsively, the fingerprint authentication system may deny access (step 1112).

In a second scenario, the unauthorized person has obtained a cast of a damaged fingerprint of the authorized person. When the fingerprint authentication system is operating in a mode wherein the temporary template fingerprint image is being used for authentication, the fingerprint authentication system may recognize that the damage to the fingerprint has not healed at all after a certain point in time, the certain point in time being the moment at which the unauthorized person obtained the cast of a damaged fingerprint of the authorized person. Responsively, the fingerprint authentication system may deny access (step 1112).

When the processor, as part of the fingerprint authentication system, analyzes a correspondence between a candidate fingerprint image and a stored template fingerprint image, the process may, for example, involve comparing a number of reference points in the candidate fingerprint image to the same reference points in the template fingerprint image. In one example, the number of reference points is 17.

When determining (steps 904, 1004, 1104) a degree of correspondence, the threshold may be set at different levels for different devices or applications. In current industry practice: a "FAST" threshold may be set at three reference points out of the 17; a "CONVENIENCE" threshold may be set as a number of reference points in the range extending from four to 11, inclusive, out of the 17; and a "HIGH" threshold may be set as a number of reference points in the range extending from 12 to 17, inclusive, out of the 17.

It is proposed herein to introduce a further level of security when the fingerprint authentication system is operating in a mode wherein the temporary template fingerprint image is being used for authentication. The fingerprint authentication system may associate damage reference points (e.g., four damage reference points) with the damage to the fingerprint that has been recognized and used when generating (step 1008) the temporary template fingerprint image.

When determining (1104) a degree of correspondence in this mode, the threshold may be set as a number of reference points in the range extending from 12 to 17, inclusive, out of the 17 regular reference points and, additionally, a number of reference points in the range extending from two to four, inclusive, out of the example four damage reference points.

It is expected that the preceding disclosure will have many applications. For example, in the fields of construction, oilfield exploration and mining, an authentication system may need to be flexible enough to handle multiple user identifications per day. Furthermore, biometrics may be damaged by micro cuts, dirt, debris and moisture.

Another example use case may be considered for medical personnel. Elements of the present disclosure may be used to enhance security for any hospital staff. Biometric authentication may be useful for prescription access, access to certain parts of a medical facility, etc. Nurses and doctors are known to wash their hands about 15-40 times a day. Accordingly, skin conditions are known to be prevalent and damage due to skin ridge dryness is known to be very heavy.

A further example use case may be considered for a Military/security/prison facility. Biometric authentication may be useful for identifying friendly soldiers, captured enemy (dead or alive) soldiers, prisoners of war or unidentified human remains.

Aspects of the present disclosure may be useful in forensic science used by police. An individual may possess a damaged fingerprint. Use of a system wherein elements of the present disclosure have been implemented, may lead to the generation of a temporary template fingerprint image for the individual. If the individual is later found dead, the temporary template fingerprint image, in combination with the skin healing models contemplated herein, may assist investigation into date of death.

Aspects of the present disclosure may be useful in disease identification. Healthy skin is known to grow at certain rate. A change in state of health (either improving or degrading) of an individual may be recognized by elements of the present disclosure, such that the user or/and family doctor may be notified. Furthermore, skin recovery growth abnormalities may be flagged and may serve as an early warning of such conditions as Skin cancer, Leukemia and Diabetes, are but three examples.

The above-described implementations of the present application are intended to be examples only. Alterations, modifications and variations may be effected to the particular implementations by those skilled in the art without departing from the scope of the application, which is defined by the claims appended hereto.

What is claimed is:

1. An input system comprising:
   a light source;
   a microlens array arranged to receive light from the light source and generate a plurality of parallel, circular cross-section beamlets;
   a lens arranged to receive light representative of the beamlets reflecting from a skin surface positioned proximal to, but not touching, the lens;
   a photography subsystem arranged to receive input from the lens and generate, based on the input, an image, the image including a plurality of non-circular shapes formed as the beamlets illuminate the skin surface; and
   an image signal processor arranged to:
   receive, from the photography subsystem, the image and, based on the image, generate a three-dimensional digital representation of the skin surface, wherein the surface is a surface of a finger;
   determine that the skin surface, from which the three-dimensional digital representation has been obtained, is a damaged skin surface; and
   responsive to the determining the damaged skin surface, generate, at a temporary template biometric generating time, a temporary three-dimensional template biometric.

2. A mobile communication device comprising:
   the input system of claim 1; and
   a processor adapted to:
   determine a degree of correspondence between the three-dimensional digital representation and the three-dimensional template biometric; and
   responsive to the degree surpassing a threshold, granting access to a system.

3. A method of operating an input system, the method comprising:
   receiving, at a microlens array, light from a light source;
   generating, with the microlens array, a plurality of parallel, circular cross-section beamlets;

receiving, at a photography subsystem, input from a lens, the input representative of the beamlets reflecting from a skin surface positioned proximal to, but not touching, the lens;

generating, at the photography subsystem and based on the input, an image, the image including a plurality of non-circular shapes formed as the beamlets illuminate the skin surface;

receiving, at an image signal processor, the image; and generating, at the image signal processor and based on the image, a three-dimensional candidate biometric that is a digital representation of the skin surface, wherein the skin surface is a surface of a finger;

determining that the skin surface, from which the three-dimensional candidate biometric has been obtained, is a damaged skin surface; and responsive to the determining the damaged skin surface, generating, at a temporary template biometric generating time, a temporary three-dimensional template biometric.

4. The method of claim 3 wherein the method further comprises:

determining a degree of correspondence between the three-dimensional candidate biometric and the three-dimensional template biometric;

determining that the degree of correspondence between the three-dimensional candidate biometric and the three-dimensional template biometric surpasses a threshold; and responsive to the determining that the degree surpasses the threshold, granting access to a system.

5. The method of claim 3 further comprising:

obtaining, at a further candidate biometric obtaining time, a further three-dimensional candidate biometric;

generating an aged version of the temporary three-dimensional template biometric, the generating based on modeling a change expected to have occurred between the temporary three-dimensional template biometric generating time and the further candidate biometric obtaining time;

analyzing a degree of correspondence between the further three-dimensional candidate biometric and the aged version of the temporary three-dimensional template biometric;

determining that the degree of correspondence between the further three-dimensional candidate biometric and the aged version of the temporary three-dimensional template biometric surpasses a further threshold; and responsive to the determining that the degree of correspondence between the further three-dimensional candidate biometric and the aged version of the temporary three-dimensional template biometric surpasses the further threshold, granting access to a system.

6. The method of claim 5 wherein the analyzing the degree of correspondence between the further three-dimensional candidate biometric and the aged version of the temporary three-dimensional template biometric comprises comparing a first plurality of reference points in the three-dimensional candidate biometric to a second plurality of reference points in the aged version of the temporary three-dimensional template biometric.

7. The method of claim 6 wherein the generating the temporary three-dimensional template biometric comprises associating a plurality of damage reference points with the temporary three-dimensional template biometric and the generating the aged version of the temporary template biometric comprises generating a plurality of aged damage reference points in the aged version of the temporary template biometric.

8. The method of claim 7 wherein the analyzing the degree of correspondence between the further candidate biometric and the aged version of the temporary template biometric further comprises comparing a further plurality of reference points in the further candidate biometric to the plurality of aged damage reference points in the aged version of the temporary template biometric.

9. A non-transitory computer readable medium containing:

computer-executable instructions that when performed by a processor in a photography subsystem, cause the processor in the photography subsystem to:

control a light source to illuminate a skin surface positioned proximal to, but not touching, the lens, the fingerprint with a plurality of parallel, circular cross-section beamlets generated by a microlens array;

receive input from a lens, the input representative of the beamlets reflecting from the skin surface;

generate, based on the input, an image, the image including a plurality of non-circular shapes formed as the beamlets illuminate the skin surface; and computer-executable instructions that when performed by a processor in an image signal processor, cause the processor at the image signal processor to:

receive the image; and generate, based on the image, a three-dimensional digital representation of the skin surface, wherein the skin surface is a surface of a finger;

determine that the skin surface, from which the three-dimensional digital representation has been obtained, is a damaged skin surface; and generate, responsive to the determining and at a temporary template biometric generating time, a temporary three-dimensional template biometric.

10. The computer readable medium of claim 9 wherein the medium further contains computer-executable instructions that, when performed by a further processor, cause the further processor to:

determine a degree of correspondence between the three-dimensional digital representation and the temporary three-dimensional template biometric;

determine that the degree of correspondence between the three-dimensional digital representation and the temporary three-dimensional template biometric surpasses a threshold; and responsive to the determining the degree surpasses the threshold, grant access to a system.

11. The computer readable medium of claim 9 further containing computer-executable instructions that cause the further processor to:

obtain, at a further candidate biometric obtaining time, a further candidate biometric;

generate an aged version of the temporary template biometric, the generating based on modeling a change expected to have occurred between the temporary template biometric generating time and the further candidate biometric obtaining time;

analyze a degree of correspondence between the further candidate biometric and the aged version of the temporary template biometric;

determine that the degree of correspondence between the further candidate biometric and the aged version of the temporary template biometric surpasses a further threshold; and responsive to the determining that the degree of correspondence between the further candidate biometric and the aged version of the temporary template biometric surpasses the further threshold, grant access to a system.

12. The computer readable medium of claim 11 wherein, to analyze the degree of correspondence between the further candidate biometric and the aged version of the temporary template biometric, the processor further caused, by the executable instructions, to compare a first plurality of reference points in the candidate biometric to a second plurality of reference points in the aged version of the temporary template biometric.

13. The computer readable medium of claim 12 wherein, to generate the temporary three-dimensional template biometric comprises associating a plurality of damage reference points with the temporary three-dimensional template biometric and the generating the aged version of the temporary template biometric, the processor further caused, by the executable instructions, to generate a plurality of aged damage reference points in the aged version of the temporary template biometric.

14. The computer readable medium of claim 13 wherein, to analyze the degree of correspondence between the further candidate biometric and the aged version of the temporary template biometric, the processor further caused, by the executable instructions, to compare a further plurality of reference points in the further candidate biometric to the plurality of aged damage reference points in the aged version of the temporary template biometric.

\* \* \* \* \*